UNITED STATES PATENT OFFICE.

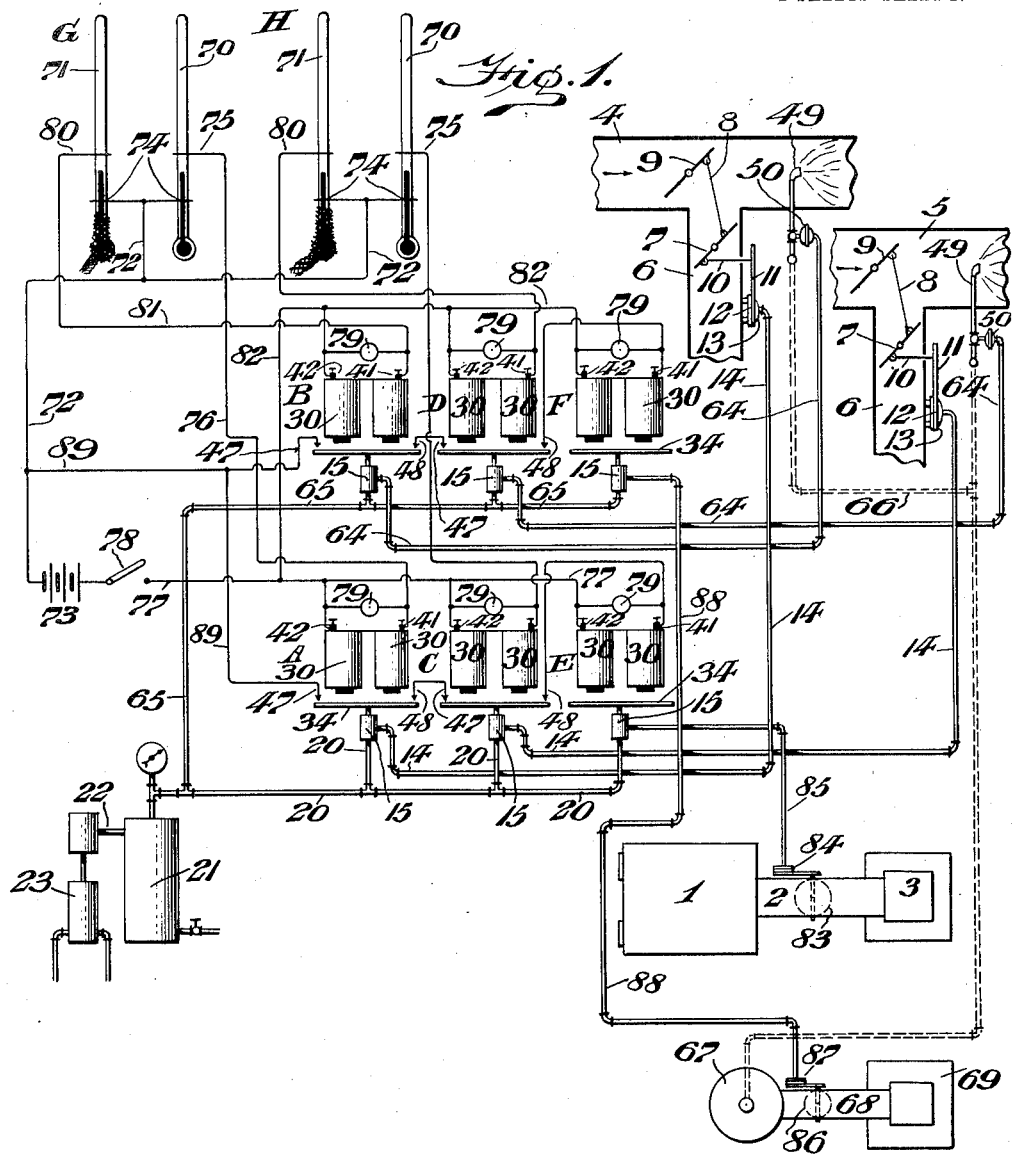

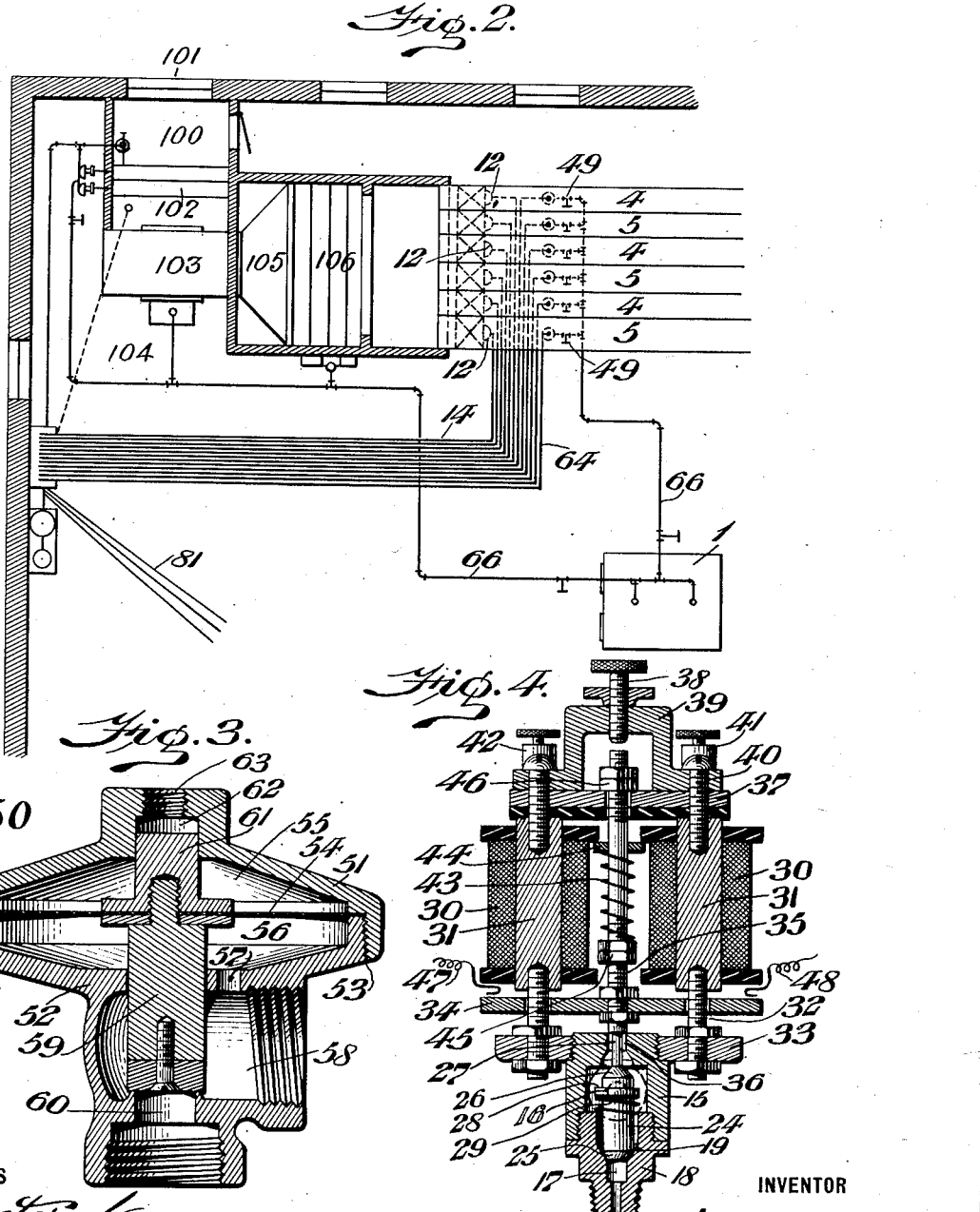

FRANK D. WINDELL, OF PHILADELPHIA, PENNSYLVANIA, ASSIGNOR OF ONE-HALF TO HENRY LEWIS WILLIAMS, OF PITTSBURGH, PENNSYLVANIA.

METHOD OF THERMOHUMIDITY CONTROL.

1,113,724.  Specification of Letters Patent.  Patented Oct. 13, 1914.

Application filed May 6, 1913. Serial No. 765,838.

*To all whom it may concern:*

Be it known that I, FRANK D. WINDELL, a citizen of the United States, residing in the city and county of Philadelphia, State of Pennsylvania, have invented a new and useful Method of Thermohumidity Control, of which the following is a specification.

This invention relates to a method of automatically controlling the temperature and humidity in a room, apartment or in any number of rooms and apartments or the like, and has for an object to provide a system which is complete, unitary and sufficiently sensitive to maintain the apparatus in a normal condition for any predetermined temperature or predetermined degree of moisture.

The method consists in mixing heated air with cold or tempered air in definite proportions according to a predetermined desired condition of the mixed fluid, such condition being dependent upon the amount of moisture in the mixed air and the temperature of that air. The mixed air resulting from combining a supply of heated air with a supply of cold or tempered air is treated by introducing at a suitable point, saturated vapor preferably in the form of steam, and thereafter automatically varying the proportions of heated air with the cold or tempered air and also regulating the quantity of vapor added thereto, both of these steps being independently controlled according to desired conditions and each being independent of the other.

My invention further consists in the utilization of electricity as a means for accomplishing the desired regulation of mixed heating fluid and moisture in such fluid, whereby an apparatus employed for the same is rendered extremely sensitive and dependable for carrying out the steps to the desired end.

For the purpose of illustrating my invention, I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a diagrammatic arrangement of an apparatus for carrying out the method of heating embodying my invention, the same showing the apparatus and its connection as installed for two rooms. Fig. 2 represents diagrammatically a plan of the installation of an apparatus for heating and controlling a number of rooms. Fig. 3 represents a vertical section of a pressure controlled diaphragm valve used in connection with my system. Fig. 4 represents a vertical section of an electrically controlled valve for governing heat and humidity conditions in accordance with the actuation of certain regulating devices.

In carrying out my novel method of thermo-humidity control, I have illustrated in the accompanying drawings one form of apparatus by means of which my method may be practised and in view of the fact that a number of the control and regulating devices are identical, I have for the sake of clearness described but one of such devices where others on other parts of the system are duplicates thereof.

Similar numerals of reference indicate corresponding parts in the figures.

Referring to the drawings, the reference numeral 1 indicates a boiler or similar generator, having a flue, 2, leading to a stack or chimney, 3. A chamber, 100, has communication with the outer air through a fresh-air intake, 101, and with a tempering coil, 102, through which the fresh air passes and has its temperature suitably increased, whereupon the fresh air enters a fan, 103, driven by a motor, 104, receiving steam from the boiler 1. The fan discharges into a chamber, 105, having suitable heating coils, 106, receiving steam from the boiler through a pipe, 66. Said heating chamber has a number of hot-air ducts, 4 and 5, leading to the several rooms or apartments to be heated. A duct, 6, for cold or tempered air communicates with each of said hot-air ducts. It will be understood that normally there are as many hot air ducts 4 and 5 as there are rooms to be heated and in view of the fact that each air duct has its own controlling apparatus all parts thereof being identical, it is not thought necessary to unduly burden the description with detailed explanations of duplicate parts and therefore the description will be confined to the apparatus controlling the room with which the duct 4 communicates.

7 designates a pivoted damper positioned in the cold air duct 6 and connected by a link 8 to a second pivoted damper 9 located in the heated air duct 4 the one of course controlling the supply of heated air and the other the supply of cold or tempered air so that the air which is mixed after passing the two dampers is delivered to the room at a temperature predetermined by the setting of the regulating devices. It will be noted that the two dampers 7 and 9 are connected so as to be simultaneously operable, the one being open or partially open while the other is closed or partially closed and both are operated in the present instance through the medium of a rod 10 connected to the lever arm 11 of a diaphragm valve or pressure motor 12, the said lever arm 11 being fulcrumed at 13 so that operation of the arm 11 will cause the damper 7 to move toward the open position while the damper 9 correspondingly moves to the closed position.

14 designates a pipe for conveying pressure fluid to the motor 12 and is in communication with a valve casing 15 by way of the port 16 as shown in Fig. 4.

17 designates the inlet port for the casing 15 which in the present instance is formed in a nipple 18 having screw-threaded engagement with the casing 15 and provided with a valve seat 19 as will be apparent. Pressure fluid is supplied to the inlet 17 and casing 15 by way of the live pipe line 20 which is under pressure of the receiving tank 21 connected by pipe 22 to the air compressor 23 which may of course be of any desired or well known type for the purpose.

24 designates the valve plug for controlling the inlet port 17 and the same is the present instance is provided with the conical ends 25 and 26 the former engaging the seat 19 to control the opening and closing of the inlet 17 while the latter in a similar manner controls the exhaust port 27 of the casing 15 which relieves the presure in the pipe 14 at the proper time. As here shown, the valve plug 24 is provided with a flange or collar 28 which serves as an abutment for a spring 29 which is interposed between the said abutment and the nipple 18 and lifts the valve to open position under certain conditions to be presently described. The valve 24 just described is utilized at a number of places in the system for controlling fluid pressure to diaphragm valves of one type or another and in order that the operation of the system may more readily be understood, I have designated this valve as a unitary structure by the reference letter A and the remaining valves similar thereto by the letters B, C, D, E, and F all of which are operated and controlled in the present instance by electrical means embodying the following structure.

30 designates a pair of electro-magnets each having a core 31 adjustably secured by bolts 32 or the like to the plate 33 of the valve casing 15 so that these parts remain in fixed position.

34 designates the armature for these magnets which is suitably disposed adjacent the poles of the magnets and mounted upon the threaded stem 35 which is positioned in alinement with the projecting stem 36 of the valve plug 24 and under normal condition the said stem 35 is in engagement with the valve plug and holds the valve closed until such time as the electro-magnets are energized.

37 designates the upper core plate of the magnets which is preferably apertured to receive the end of the stem 35 which terminates in opposed relation to a thumb adjusting screw 38 threaded into a yoke 39 fixed to the magnet frame by screws 40 or the like.

41 and 42 designate binding posts for the conductors carrying the current to the aforesaid electro-magnets.

43 designates a spring interposed between a suitable fixed plate 44 and adjusting nuts 45 upon the stem 35, the said spring being stiffer and stronger than the spring 29 of the valve member 24 so that the stem 35 under normal deënergized condition engages the stem 36 of the valve and maintains the latter in closed position.

46 designates adjusting nuts for the end of the stem 35 so that the latter may be relatively adjusted to the stem 36 as will readily be understood.

The operation of this valve is as follows:—Whenever a circuit is closed through the magnets 30 the armature 34 will be drawn toward the magnet and in a direction to carry the stem 35 away from or out of contact with the valve stem 36 whereupon the spring 29 will actuate the valve plug 24 so that the exhaust port 27 is closed and the inlet 17 opened and pressure is thereupon supplied to the pipe 14 from the live line 20. In the present instance, I have utilized the armature 34 as a circuit closer for an auxiliary circuit the terminals of which are shown and designated by the reference numerals 47 and 48, the said terminals being so positioned that whenever the armature 34 is drawn toward the magnets, it will contact with the aforesaid terminal and close a circuit which will later be described.

The above description relates entirely to the control mechanism for the temperature ducts with the omission of the automatic regulating devices for such control mechanism, since it is thought the operation and construction will be clearer by leaving the automatic feature until later. The description of the humidity control mechanism will therefore now be taken up in detail.

49 designates a nozzle suitably positioned to discharge into the duct 4 at a point beyond the two dampers 7 and 9 and it is controlled in the present instance by means of a diaphragm motor 50 constructed in the present instance as follows:—51 and 52 designate respectively sections of the casing of the motor 50 which in the present instance are in threaded engagement, as shown at 53, and clamp between them the diaphragm plate 54. This latter is formed of flexible material and divides the casing into the chambers 55 and 56, the latter having communication through the port 57 with the inlet 58 of the casing section 52. 59 designates a valve plug suitably fixed to the diaphragm 54 and serving as a control means for the outlet 60 of the section casing 52. The plug 59 has an extension 61 on the opposite side of the diaphragm 54 which is suitably guided in the recess 62 which communicates by way of the threaded opening 63 with a pipe 64 leading to the valve B which is connected with the live line or pipe 65 from the receiving tank 21. The nozzle 49 is connected to the outlet 60 while the inlet 58 communicates with the live steam or vapor line 66 the latter being supplied from a generator 67. 68 designates the smoke flue of the generator 67 which communicates with the stack 69 the regulation of which will presently be described.

From the above description it will be apparent that when the electro-magnets 30 of the valve B are energized, pressure fluid will be admitted from the live line 65 to the pipe 64 and conveyed to the motor 50 which is thereupon actuated to close the valve 59 and cut off the supply of saturated vapor or steam to the nozzle 49, since the pressure of said fluid admitted back of the valve extension 61 is always greater than the pressure in the steam or vapor line 66. Under normal conditions therefore the valve 59 will be maintained open by the pressure of the steam from the generator 67 and the mixed air in the duct 4 will be supplied with saturated vapor sufficient to maintain the predetermined conditions of humidity.

It will now be apparent that the valves A and B respectively control the temperature and humidity of the air delivered to a given locality or room and the description of the means for automatically controlling these two valves will now be taken up in detail together with the complete unitary operation of the system. In connection with this description it will be noted that the reference letters G and H designate sets of instruments respectively located in the room to be controlled there being of course as many sets of these instruments as there are rooms to be regulated and therefore but one set of instruments will be described in detail.

70 designates a dry bulb thermometer and 71 a wet bulb thermometer both instruments being of well known construction and of any desired type for the purpose in view.

72 designates a wire leading from the battery 73 and forming the common return for all the instruments included in the circuit, the said wire having terminals 74 sealed respectively into the dry and wet bulbs 70 and 71 and of course in contact with the mercury in the said bulbs.

Considering first the circuit for the dry bulbs, 75 designates a terminal sealed into the bulb at a predetermined point, namely, the one corresponding to the highest temperature desired or temperature to be maintained in a given room. The terminal wire 75 is connected by a wire 76 to the binding post 41 of the electro-magnet controlled valve A and the circuit is completed through the electro-magnets, binding post 42 and wire 77 back to the battery, a switch 78 being interposed in this line if desired.

79 designates an incandescent light connected in parallel with the electro-magnet in order to flash a signal to indicate that this valve is operated, this often being a useful source of information to the operator in control of the system.

80 designates a terminal of the wet bulb circuit which is sealed into the said bulb at the point corresponding to the temperature at which artificial humidity is to be maintained, that is to say, artificial humidity will be supplied to the air duct until the mercury in the wet bulb forms a connection between the terminals 74 and 80. When this takes place a circuit is closed by way of the wire 81, binding post 41 of valve B, electro-magnets 30, binding post 42 and wire 82 to wire 77 to the battery. The closing of either of the foregoing circuits energizes the electro-magnets 30 and allows the plug valve 24 to open and admit pressure fluid to the control motors for either the dampers 7 and 9 or the humidity nozzle 49, depending of course upon whether the wet or dry bulb has closed the circuit. Of course should both instruments close their respective circuits simultaneously then both the damper control and humidity nozzle would simultaneously be actuated, the one being opened to admit cold or tempered air while the other would be cut off entirely.

In the operation of a system such as above described, it occurs more or less frequently that at certain times all of the rooms will simultaneously require less heat or simultaneously require a diminution in the supply of artificial humidity and in order that these conditions may be met and controlled economically, I have provided a governing mechanism for regulating the system as a whole, which operates directly upon the main heating furnace 1 and upon the humidity boiler 67. This governing mechanism as here shown is constructed to control the flue or stack draft of the respective generators and for this purpose I provide a damper 83 located in the flue 2 and controlled by a pressure motor 84 similar to the motor 12 heretofore described. The motor 84 is actuated by pressure fluid transmitted by the pipe 85 from the live line 20 and controlled by the electro-magnet actuated valve E so as to open and close the damper 83 at the times desired, the opening of the latter of course creating more draft in the generator and the closing thereof checking the generator.

The mechanism for controlling the humidity generator 67 is substantially similar since it comprises a damper 86 located in the flue 68 and controlled by a pressure motor 87 controlled by pressure fluid supplied by the pipe 88. This pipe connects with the outlet 16 of the electro-magnetic control valve F and receives pressure fluid from the live pipe 65 as heretofore explained.

The two valves E and F therefore become respectively a controlling means for the temperature and the humidity of the entire system, and operate in exactly the same manner as do the same valves which control conditions for the individual rooms. The circuit for energizing the magnets of the valves E and F is, however, a separate and different circuit than those heretofore described, since it is controlled by the simultaneous actuation of all the armatures 34 of either the temperature magnets or the humidity magnets as the case may be. Thus for example, should all the rooms simultaneously reach an excess temperature the armatures of the valves A and C of Fig. 1 will be operated to close the respective terminals 47 and 48 thus closing the circuit by way of the wire 89, contacts 47 and 48, armatures 34, electro-magnets of valve E and return to the battery by wire 77. The humidity control governor valve F is similarly operated by the simultaneous actuation of the valves B and D so as to close a circuit from battery 73, conductor 89, contacts 47 and 48, armature 34 of valves B and D, electro-magnets of valve F and return by conductor 82 to conductor 77 to the battery.

In Fig. 2 I have shown a plan of a system embodying my invention wherein the apparatus is arranged to supply a large number of rooms and in which I have designated the parts for convenience with the same numerals of reference as used in Fig. 1 where it is possible to do so, so that there will not be a multiplicity of reference numerals and consequent confusion.

The operation of the device is as follows:—In each room, apartment or the like which is to be heated and regulated as to temperature and humidity, there is located a thermometer 70 and a wet-bulb thermometer 71 connected in accordance with the foregoing description and each room also of course is connected with the heating plant by a duct such as 4 receiving both heated and cold or tempered air. In starting the apparatus, it will be assumed that the room is cold and therefore the mercury in the instruments is at a point below the terminals 75 and 80, while the dampers 7 and 9 are positioned so as to close the cold or tempered air supply and open the duct 4 to heated air only. With this heated air the vapor from nozzle 49 is mixed and supplies the room with warm air saturated to the desired condition. As the temperature rises, the mercury in both the wet and dry bulbs expands until the contact of the mercury in the dry bulb engages the adjusted terminal 75, it of course being apparent that the mercury in the wet bulb rises much more slowly owing to the evaporation of the moisture upon the same.

Considering the room in which the instruments G are located to be the one under discussion, contact of the mercury with the terminal 75 will close the circuit through the electro-magnets 30 of valve A and also simultaneously flash the indicator light 79. The energizing of these magnets raises the armature 34 and allows the spring 29 to open the inlet valve 17 and permit the pressure fluid to enter the pipe 14 and actuate the pressure motor 12. This action operates the dampers 7 and 9 so that the former is opened while the latter is closed and thus the room is immediately supplied with air at a lower temperature causing a reduction of temperature in the room. As soon as this reduction affects the dry bulb 70, the mercury contracts and breaks the circuit just established whereupon the spring 43 of the valve A returns the armature to its former position and at the same time the stem 35 strikes the valve plug 24 and returns it to closed position allowing the pipe 14 to exhaust through the port 27. As a result of this action the dampers 7 and 9 are swung in the reverse direction to open the hot air duct and cut down the cold air duct. While this operation is taking place, the increase in the humidity due to the artificial supply causes the mercury in the wet bulb 71 to rise until a circuit is closed by its contact with the terminal 80 whereupon a circuit is closed through the electro-magnet valve B and pressure fluid admitted by way of pipe 64 to the motor 50 which thereupon cuts off the supply of vapor to the duct 4.

In the event that the automatic regulating instruments in each room are all simultaneously actuated to reduce the temperature, the energization of the two valves A and C will cause their armatures to close the circuit through the valve E whereupon pressure fluid is admitted to the pipe 85 and causes the motor 84 to close the check damper of the main heater 1. In case all the rooms simultaneously actuate the humidity control the operation of the armatures or valves B and D will close the circuit through the electro-magnet valve F thus admitting pressure fluid to the pipe 88 and closing the damper 86 of the humidity generator so as to check the supply of vapor to all of the rooms.

It will now be apparent that I have devised a novel method and apparatus of regulating the temperature and humidity of a room or a number of rooms, wherein the temperature controlled mechanism and the humidity controlled mechanism are independently operable in the same system and automatically control and regulate the mixing of the room heating medium.

It will further be seen that by this novel system the supply of moisture to the heating medium for any particular room requiring more moisture or any combination of rooms requiring the same is automatically controlled by a regulator actuated by the wet bulb controlling that room, so that the supply of moisture necessary is delivered to that room, and the humidity thereof raised to the desired point. In a similar manner, if the rooms require less heat, the temperature regulator will automatically cut down the supply of heat regardless of whether the rooms require more moisture or not.

It will further be apparent that by my novel system I am enabled not only to control and regulate the temperature of any particular room or any group of rooms but in connection therewith I have provided a novel automatic governing mechanism for simultaneously controlling the temperature and humidity of all the rooms together by acting directly upon the heat and humidity generators. This governing system is, however, actuated only at the time when all of the rooms in the system are simultaneously demanding less heat or less humidity and it therefore acts as a safety governor for directly regulating the fuel consumption.

It will further be apparent by my novel method of heat regulation that the temperature change or humidity change required to actuate the various mechanisms is very slight and it will therefore be understood that the device in so far as the temperature is concerned accomplishes automatic mixing. By automatic mixing I mean that on account of the fact that the mixing dampers are adjusted to move very slowly, approximately three minutes being required to change them from one position to the other through substantially the complete movement, and in view of the fact that an extremely slight operation of the damper will make or break the electric control circuit, the mixing dampers are started on the up stroke before they have completed the down stroke, that is to say, after the temperature of the room has reached the point at which the regulating instruments are set, a slight change in temperature may occur, which immediately affects the mixing dampers, so that the latter are practically in constant motion either up or down to produce an automatic mixing of the heated supply.

It will further be apparent that changes in the wet bulb damper will actuate the mechanisms in the same way, and a very slight difference in the humidity will cause practically an instantaneous variation in the humidity supply, owing to the extreme sensitiveness of the automatic devices.

It will further be apparent that while I have described the device as used in connection with an indirect heating system as shown in Fig. 2, the same is readily applicable to direct systems of heating and may be adapted readily to any of the direct known systems in use where the heating surface is placed in the room itself to be heated.

Having thus described my invention, what I claim as new and desire to secure by Letters Patent, is:—

1. The method of temperature and humidity regulation, which consists in providing a source of temperature and of humidity changing mediums in communication with a plurality of inclosures, and of maintaining a predetermined temperature and a predetermined relative humidity in each of the plurality of inclosures, irrespective of the temperatures and relative humidities maintained in the other inclosures.

2. The method of temperature and humidity regulation, which consists in providing a source of temperature and of humidity changing mediums in communication with a plurality of inclosures, and of maintaining automatically a predetermined temperature and a predetermined relative humidity in each of the plurality of inclosures, irrespective of the temperatures and relative humidities maintained in the other inclosures.

3. The method of temperature and humidity regulation which consists in independently causing the temperature and humidity of each of a number of rooms or places to respectively control and maintain the temperature and humidity of each of said rooms at predetermined fixed points, and causing the temperature of all of said rooms under predetermined conditions to control the main source of temperature supply to all of said rooms.

4. The method of temperature and humidity regulation which consists in independently causing the temperature and humidity of each of a number of rooms or places, to respectively control and maintain the temperature and humidity of each of said rooms at predetermined fixed points, and causing the humidity of all of said rooms under predetermined conditions to control the main source of humidity supply to all of said rooms.

5. The method of temperature and humidity regulation which consists in independently causing the temperature and humidity of each of a number of rooms or places to respectively control and maintain the temperature and humidity of each of said rooms at predetermined fixed points, and causing the humidity and temperature of all of said rooms under predetermined conditions to control the main supply of temperature and humidity to all of said rooms.

6. The method of temperature and humidity regulation which consists in providing a source of temperature changing medium and of humidity changing medium in communication with a plurality of inclosures, in admitting a mixture of said temperature changing medium and air of normal temperature to each of said inclosures, in automatically controlling the degree of mixture for each inclosure by means influenced by the temperature therein, admitting humid vapor into said mixture for each individual inclosure, in automatically controlling such admission for each inclosure by means influenced by the degree of humidity therein and in automatically indicating which means is in operation.

7. The method of temperature and humidity regulation which consists in providing a source of temperature changing medium and of humidity supply in communication with a plurality of inclosures, in individually controlling the introduction of the temperature and humidity changing mediums into each inclosure to maintain the temperature and humidity therein at a predetermined standard irrespective of the standard in another inclosure, and in automatically and individually indicating when the temperature and humidity of each room is at or below the predetermined standard.

8. The method of temperature and humidity regulation, which consists in providing a source of temperature and of humidity changing mediums in communication with a plurality of inclosures, and of controlling the introduction of the temperature and humidity changing mediums into each of the plurality of inclosures, to maintain a predetermined temperature and a predetermined relative humidity in each of said plurality of inclosures, irrespective of the temperatures and relative humidities maintained in the other inclosures.

9. The method of temperature and humidity regulation, which consists in providing a source of temperature and of humidity changing mediums in communication with a plurality of inclosures, and of controlling automatically and separately the introduction of the temperature and humidity changing mediums into each of the plurality of inclosures to maintain a predetermined temperature and a predetermined relative humidity in each of the plurality of inclosures, irrespective of the temperatures and relative humidities maintained in the other inclosures.

10. The method of temperature and humidity regulation, which consists in providing a source of temperature and of humidity changing mediums in communication with a plurality of inclosures, in admitting the temperature changing medium to each of said inclosures, in automatically controlling the admission of the temperature changing medium for each inclosure by means influenced by the temperature therein, admitting humidity changing medium to each of said inclosures, and in automatically controlling such admission for each inclosure by means influenced by the relative humidity therein.

FRANK D. WINDELL.

Witnesses:
C. D. McVay,
M. E. Byrne.